United States Patent
Oroskar et al.

(10) Patent No.: US 8,452,312 B1
(45) Date of Patent: *May 28, 2013

(54) DYNAMIC PAGING FOR HYBRID MOBILE STATIONS

(75) Inventors: Siddharth S Oroskar, Overland Park, KS (US); Sachin R Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 465 days.

This patent is subject to a terminal disclaimer.

(21) Appl. No.: 12/776,287

(22) Filed: May 7, 2010

(51) Int. Cl.
*H04W 68/00* (2009.01)
*H04W 4/00* (2009.01)
*H04B 7/00* (2006.01)
*H04B 7/216* (2006.01)

(52) U.S. Cl.
USPC ............ 455/458; 455/515; 370/335; 370/338

(58) Field of Classification Search
USPC ............................ 455/458, 515; 370/335, 338
See application file for complete search history.

(56) References Cited

U.S. PATENT DOCUMENTS

| | | | |
|---|---|---|---|
| 5,369,681 | A | 11/1994 | Boudreau et al. |
| 6,181,945 | B1 | 1/2001 | Lee |
| 6,745,039 | B1 | 6/2004 | Di Lalla |
| 7,366,526 | B2 | 4/2008 | Zhang et al. |
| 2006/0182069 | A1* | 8/2006 | Yu ................................. 370/335 |
| 2006/0251033 | A1 | 11/2006 | Oprescu-Surcobe et al. |
| 2008/0032713 | A1 | 2/2008 | Yang |
| 2008/0096520 | A1 | 4/2008 | Benco et al. |
| 2008/0261628 | A1* | 10/2008 | Proctor et al. ................. 455/458 |
| 2008/0287134 | A1* | 11/2008 | Catovic et al. ................. 455/445 |
| 2008/0293437 | A1 | 11/2008 | Ranganathan et al. |

OTHER PUBLICATIONS

Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Cai et al., "Mitigating DoS Attacks on the Paging Channel by Efficient Encoding in Page Messages," Computer Science Department.

* cited by examiner

*Primary Examiner* — Kamran Afshar
*Assistant Examiner* — Omoniyi Obayanju

(57) ABSTRACT

Methods and systems are disclosed herein that may help to improve the paging success rate for hybrid mobile stations, which in turn may help to prevent dropped calls. An exemplary method for paging an access terminal involves an access network: (a) before transmission of a page to an access terminal, determining whether or not the access terminal is a hybrid access terminal; (b) if the access terminal is not a hybrid access terminal, then selecting standard page settings for the page; (c) if the access terminal is a hybrid access terminal, then selecting adjusted page settings for the page, wherein the adjusted page settings increase the probability that the access terminal will successfully receive the page; and (d) applying the selected page settings and transmitting the page. To help increase the probability that the access terminal will successfully receive the page, the adjusted page settings for the page may involve setting that reduces or disables concatenation of the page and/or an increased page-transmission power.

15 Claims, 5 Drawing Sheets

DYNAMIC PAGING FOR HYBRID MOBILE STATIONS

BACKGROUND

In a typical cellular radio communication system (also referred to as a wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (which may also be referred to herein by "AT") communicates via an RF air interface with the BTS antenna of the cell. Consequently, a communication path is established between the access terminal and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

In some wireless communication systems or markets, a wireless service provider may implement more than one type of air interface protocol within a single system. For example, a carrier may support one or another version of CDMA, such as EIA/TIA/IS-2000 Rel. 0, A (referred to herein as "IS-2000") for both circuit-cellular voice and data traffic, as well as a more exclusively packet-data-oriented protocol such as EIA/TIA/IS-856 Rel. 0, A, or other version thereof (referred to herein as "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal."

OVERVIEW

When a hybrid access terminal operates in a hybrid wireless communication system, such as a hybrid IS-2000/IS-856 system, and is engaged in an active IS-856 data communication session, the access terminal typically continues to periodically scan the IS-2000 paging channel (as well as other IS-2000 control channels) for any page messages or other IS-2000 alerts or messages. Because the IS-2000 interface and the IS-856 interface use different RF frequencies, the hybrid access terminal must tune to the IS-2000 interface (and away from the IS-856 interface) in order to conduct the scan. When the IS-856 connection is temporarily interrupted in order to scan the IS-2000 paging channel, this is referred to as a "tuneaway" scan.

When a hybrid access terminal performs a tuneaway scan, but does not detect a page message as expected, the hybrid terminal will remain tuned to the IS-2000 interface (and disconnected from the IS-856 interface) until the next-scheduled page message, which in IS-2000, is typically 5.12 seconds (a period referred to as the paging slot cycle), and will continue to wait until it successfully receives a page message. This may present a problem, for when the hybrid access terminal tunes to IS-2000, and the serving base station no longer detects the access terminal on the IS-856 interface, the base station typically starts a drop-call timer. In practice, the drop call timer is typically eight to ten seconds (although the duration may vary), which means it may expire while the access terminal waits for the next page message (e.g., when it takes more than two page-slot cycles to receive a page message). Thus, in the event that a hybrid access terminal does not receive a page message while tuned away to the IS-2000 interface, and the drop-call timer expires, the IS-856 call will be dropped.

Accordingly, methods and systems are disclosed herein that may help to increase the probability that a hybrid access terminal successfully receives a page; i.e., that may help to increase the paging success rate (PSR). This in turn may help to prevent the scenario where an access terminal remains tuned away from IS-856 to wait for an IS-2000 page, causing a call to be dropped. For instance, exemplary embodiments may involve a base station increasing the page-transmission power of pages to hybrid access terminals and/or reducing or disabling concatenation of pages to hybrid access terminals, both of which may help to increase the PSR for hybrid access terminals (as concatenating pages before transmission typically reduces the PSR). Other adjustments to the paging process to improve the PSR for hybrid access terminals are also possible, in addition or in the alternative to increasing page-transmission power and/or adjusting concatenation.

In one aspect, an exemplary method for paging an access terminal involves: (i) before transmission of a page to an access terminal by an access network, the access network determining whether or not the access terminal is a hybrid access terminal; (ii) if the access terminal is not a hybrid access terminal, then selecting standard page settings for the page; (iii) if the access terminal is a hybrid access terminal, then selecting adjusted page settings for the page, wherein the adjusted page settings increase the probability that the access terminal will successfully receive the page; and (iii) applying the selected page settings and transmitting the page. Preferably, the adjusted page settings for the page comprise at least one of (a) a concatenation setting that reduces or disables concatenation for the page and (b) an increased page-transmission power.

In a further aspect, another exemplary method for paging an access terminal involves: (i) an access network, before transmission of a page to an access terminal by the access network: (a) determining whether or not the access terminal is a hybrid access terminal; (b) if the access terminal is a hybrid access terminal, then disabling page-concatenation for the page; and (c) otherwise, if the access terminal is not a hybrid access terminal, then enabling page-concatenation for the page; and (ii) the access network transmitting the page to the access terminal.

And in a further aspect, another exemplary method for paging an access terminal involves: (i) an access network, before transmission of a page to an access terminal by the access network: (a) determining whether or not the access terminal is a hybrid access terminal; (b) if the access terminal is not a hybrid access terminal, then selecting a first page-transmission power for the page; and (b) otherwise, if the access terminal is a hybrid access terminal, then selecting a second page-transmission power for the page; and (ii) the access network transmitting the page to the access terminal at the selected page-transmission power. Preferably, the second page-transmission power is greater than the first page-transmission power.

And in yet a further aspect, an exemplary system configured to page an access terminal is disclosed. The exemplary system includes: (i) a tangible computer readable medium; and (ii) program instructions stored on the tangible computer readable medium and executable by at least one processor to (a) before transmission of a page to an access terminal by an access network, determine whether or not the access terminal is a hybrid access terminal; (b) if the access terminal is not a hybrid access terminal, then select standard page settings for the page; (c) if the access terminal is a hybrid access terminal, then select adjusted page settings for the page, wherein the adjusted page settings increase the probability that the access terminal will successfully receive the page; and (d) apply the selected page settings and cause the access network to transmit the page.

In an exemplary system, the standard page settings may include a concatenation setting that enables concatenation of pages, while the adjusted page settings include a concatenation setting that disables concatenation of pages. Additionally or alternatively the standard page settings may include a first page-transmission power, while the adjusted page settings include a second page-transmission power (which is preferably greater than the first page-transmission power).

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
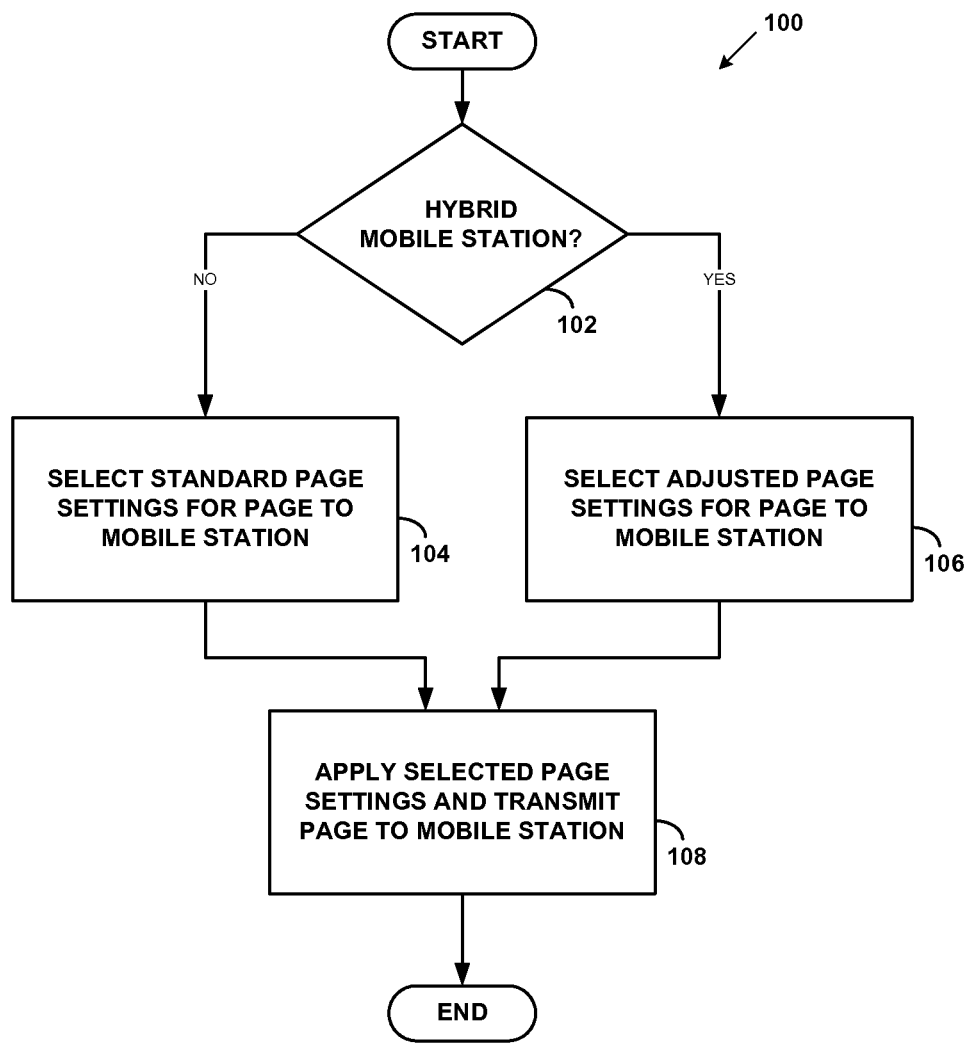
FIG. 1 is a flow chart illustrating a method for paging an access terminal, according to an exemplary embodiment.

FIG. 1 is a flow chart illustrating a method 100 for paging an access terminal, according to an exemplary embodiment. The method 100 may be implemented by an access network (i.e., by one or more entities in the access network), which may also be referred to as a radio access network (RAN), in order to help improve the paging success rate (PSR) for hybrid access terminals. It should understood that functions described herein as being carried out by an access network are, in practice, typically carried out by one or more entities in the access network such as, for example, one or more base stations and/or one or more switching entities.

Method 100 involves an access network, before transmission of a page to an access terminal, determining whether or not the access terminal is a hybrid access terminal, as shown by block 102. Then, if the access terminal is not a hybrid access terminal, the access network selects standard page settings for the page, as shown by block 104. On the other hand, if the access terminal is a hybrid access terminal, then the access network selects adjusted page settings for the page, which help to increase the probability that the access terminal will successfully receive the page, as shown by block 106. The access network then applies the selected page settings (i.e., either the standard settings or the adjusted settings) and transmits the page, as shown by block 108.

Page settings may include various properties of a page. For example, an access network may be configured to concatenate pages to conserve bandwidth, and as such, may be configured to enable and disable concatenation, and possibly to apply varying degrees of concatenation to a page. Therefore, a page setting may be provided to specify whether concatenation is enabled or disabled (and possibly the amount of concatenation to be applied). As another example, an access network may be configured to vary the page-transmission power with which a page is transmitted. Thus, a page setting may be provided to specify the page-transmission power. Other examples of page settings, which relate to the manner in which a page is created, processed, and/or transmitted, are also possible.

Since concatenating pages may reduce the PSR, disabling concatenation for hybrid access terminals may help to increase the PSR for hybrid access terminals. Increasing the page-transmission power may likewise help to increase the PSR for hybrid access terminals. An exemplary method may therefore adjust page settings for a page to a hybrid access terminal help to increase the PSR for hybrid access terminal (possibly in a multi-faceted manner, when concatenation is disabled and page-transmission power is increased).

Accordingly, in an exemplary embodiment, the standard page settings may include a standard concatenation setting corresponding to at least some level of concatenation. Additionally or alternatively, the standard page settings may include a standard or default page-transmission power setting (which in IS-2000 is typically 1.2 watts). As such, when the standard page settings are selected, applying the standard page settings may involve concatenating the page before transmission and/or using a default page-transmission power to transmit the page.

Further, in an exemplary embodiment, the adjusted page settings may include, for example, a reduced concatenation setting (which is preferably a setting that disables concatenation altogether). Additionally or alternatively, the adjusted page settings may include a higher-power page-transmission power setting (as compared to the default page-transmission power setting). As such, when the adjusted page settings are selected, applying the adjusted page settings may involve reducing or disabling page concatenation and/or increasing the page-transmission power used to transmit the page.

Figure 2:
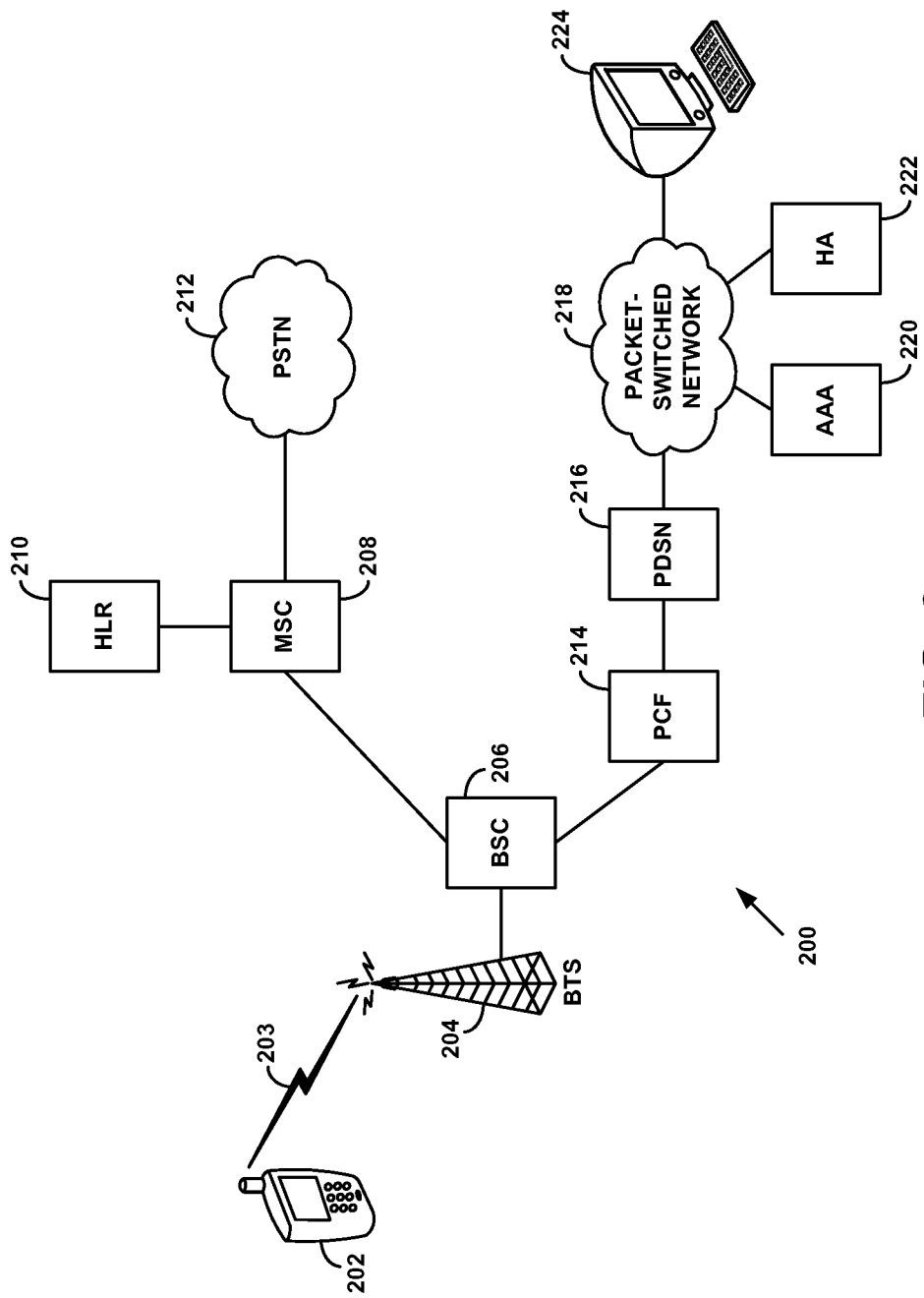
FIG. 2 is a block diagram illustrating a wireless communications network in which an exemplary embodiment may be implemented.

FIG. 2 is a block diagram illustrating a network 200 in which an exemplary embodiment may be implemented. The network includes at its core a RAN 201, which radiates to define numerous coverage areas in which access terminals can engage in RF communication with the RAN. The RAN 201 may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served access terminal can move seamlessly from one coverage area to another.

To provide service, the RAN 201 may include numerous base transceiver stations (BTSs) 204 and one or more base station controllers (BSCs) 206 (which may be integrated with one or more of the base stations). To engage in wireless communications, access terminal 202 communicates over an air interface 203 with BTS 204, which is then coupled or integrated with a BSC 206. Transmissions over air interface 203 from BTS 204 to access terminal 202 represent the forward link to the access terminal, while transmissions over interface 203 from access terminal 202 to BTS 204 represent the reverse link.

For simplicity, just a single coverage area is shown emanating from BTS 204, but it should be further understood that a typical BTS may provide multiple discrete coverage areas, such as multiple cell sectors for instance. As such, a BTS may include one or more directional antennas, power amplifiers, and associated transceiver equipment arranged to establish one or more corresponding wireless coverage areas via one or more air interfaces 203, and to communicate with access terminals in those coverage areas.

In an exemplary embodiment, BTS 204 preferably includes a power amplifier such as a tower-top amplifier for instance (and possibly multiple power amplifiers, with one for each sector it serves), which is arranged to amplify RF signals for transmission over the respective air interface to access terminals. Preferably, the power amplifier has a variable gain that can be set by a control signal received from a controller such as BSC 206 or from other base station equipment for instance. Variable gain power amplifiers are well known in the art and are therefore not described in detail here.

As shown, BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal 202 may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

In a further aspect, RAN 201 may be a hybrid system, which is configured to provide service under both IS-856 and IS-2000 in at least a portion of its coverage area. As such, BTS 204 is preferably a "dual-mode" base station, which is configured to provide service under IS-856 when available, and to revert to providing service under IS-2000 if necessary. Further, the RAN 201 may include other base stations (not shown), which may be hybrid base stations, or base stations that only provide service under IS-2000 or IS-856.

Under IS-2000, the highest rate of packet-data communications theoretically available on a fundamental traffic channel of the forward link is 9.6 kbps, dependent in part on the power allocated to the forward-link traffic channel and the resultant signal to noise characteristics. IS-856, however, leverages the asymmetric characteristics of most IP traffic, in which the forward link typically carries a higher load than the reverse link. As such, under IS-856, each access terminal receives forward-link transmission from only one active sector at a time. In turn, each sector transmits to all its active ATs on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel, which the access terminal uses to periodically send the access network messages indicating the supportable data rate and best serving sector for the forward link.

Further, in a hybrid system, a dual-mode BTS 204 typically provides IS-2000 and IS-856 coverage on different carrier frequencies, each of which is 1.25 MHz in bandwidth for consistency with legacy operation. In practice, most IS-856 systems are provided as overlays on existing IS-2000 systems, such that existing BSCs provide either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. Hybrid sectors typically use the same PN offset for both EVDO and 1x-RTT communications.

In a further aspect of IS-2000 service, RAN 201 (and in particular, a base station (e.g., BTS 204 and/or BSC 206) and/or a switch (e.g., MSC 208)), may be configured to page a number of access terminals at once by transmitting a General Page Message (GPM), which includes multiple pages. Each page included in a GPM may be referred to as a "page record" or interchangeably as a "page". In an exemplary embodiment, an MSC 208 typically receives an indication that an access terminal should be paged (e.g., for an incoming IS-2000 call), which includes an identifier of the access terminal, such as a Mobile Identification Number (MIN) or International Mobile Subscriber Identity (IMSI). The MSC 208 may then use the MIN or IMSI as a basis to determine the carrier air interface (CAI) transmit address fields, and encode these fields into a page record. The page record may then be sent to one or more base stations. Each base station may then include the page record in a GPM, which the base station transmits in its coverage area.

According to an exemplary embodiment, a base station may be configured to create a GPM that includes multiple page records, such that multiple access terminals can be paged using a single GPM. Furthermore, page records may be concatenated so that more page records may be included in a GPM than otherwise could be. For example, in some embodiment up to eight page records may be concatenated in a single GPM. Further, some embodiments may involve concatenation in which up to two page records may be concatenated in a single GPM. Other concatenation techniques are also possible.

When page records are not concatenated, each GPM typically includes only one page record, and typically occupies two 20 ms half-frames. In comparison, some concatenation techniques may allow for two page records to be concatenated in a GPM that can be sent in two to three half frames. Further, some concatenation techniques may provide for more concatenation of page records, such that at least five page records can be sent in a single 80 ms paging-channel slot. Yet further, some concatenation techniques may provide for a GPM in which two to eight page records can be concatenated. Such a GPM may be sent in two to eight half frames, which allows a base station to transmit up to eight page records in a single 80 ms paging-channel slot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff for increasing concatenation (which may reduce the paging channel occupancy (PCO)). Since more page records are being concatenated for transmission in the same 80 ms slot, errors in transmission may have a greater effect such that a page may fail to reach its intended access terminals. Further, some access terminals may not be configured to receive concatenated page records. Both of these factors (and possibly other factors as well) may cause the PSR to decrease due to concatenation.

In general, it should also be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Furthermore, throughout this description, the term "base station" may be used to refer to a Radio Access Network (RAN) element such as a BTS, a BSC, or combination BTS/BSC, for instance. The term "radio network controller" (RNC) can also be used to refer to a BSC, or more generally to a base station.

Referring now to access terminal 202, it may be any device arranged to carry out the access-terminal functions described herein. As examples, access terminal 202 could be or include a cell phone, a PDA, a computer, a laptop computer, a hybrid CDMA/EV-DO device, and/or a multi-mode cellular/Wi-Fi device. As such, an access terminal may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

Given the proliferation of legacy IS-2000 systems, IS-856 was designed to be backwards compatible and to facilitate "hybrid" operation. Accordingly, access terminal 202 may be a hybrid access terminal that can operate on both IS-2000 and IS-856 networks as required. A typical hybrid access terminal, for instance, may be capable of receiving voice, short message service (SMS) messages, and dedicated channel data services on IS-2000 networks, as well as high-speed packet data service on IS-856 networks. Note that a hybrid system could support additional or alternative air interface protocols, in which case, a hybrid access terminal might also be capable of operation under these additional or alternative protocols. A hybrid access terminal that is engaged in an IS-2000 or IS-856 communication (i.e., has an assigned traffic channel on the IS-2000 or IS-856 air interface, respectively), may be said to be in an "active" state or mode under the respective protocol. Conversely, a hybrid access terminal that has no active data session or voice call (i.e., no assigned traffic channel), but is otherwise operational in an IS-2000 system, is said to be in an "idle" state or mode in IS-2000.

In typical operation, a hybrid access terminal remains in an IS-2000 idle state (i.e., is registered with the IS-2000 system), while it is engaged in an IS-856 call. As such, the access terminal continues to monitor the paging and control channels in the IS-2000 system, in search of any incoming pages, voice calls, SMS messages, or the like, and to monitor IS-2000 pilot signals. More specifically, during an active IS-856 communication (i.e., data session), an access terminal has its antenna and receiver tuned to the RF frequency of the IS-856 interface. However, in order to scan the IS-2000 interface according to its assigned paging slot (e.g., every 5.12 seconds), the access terminal must periodically tune to the RF frequency of the IS-2000 interface and tune away from the IS-856 interface for the duration of the scan interval. These slot-cycle scans, commonly referred to as "tuneaway scans," can have an impact on quality and throughput of IS-856 communications. For example, a slot cycle index of 2 corresponds to a tuneaway scan every 5.12 s, or a roughly 2-4% interruption of an IS-856 communication in terms of time (assuming 80-160 ms scans).

It should be understood that, in practice, an access terminal typically will perform a tuneaway scan periodically to scan for a GPM during its paging slot cycle, regardless of whether the GPM includes a page for the access terminal. This is because the access terminal does not know whether it is being paged until it receives the GPM and determines that the GPM includes a page record for the access terminal (or conversely, in the event that there is no page record for the access terminal in the GPM, determines that it is not being paged). Therefore, as base stations are configured to transmit a GPM during each paging time slot, the access terminal expects to receive a GPM in each paging time slot, regardless of whether the access terminal is actually being paged.

In the event that a hybrid access terminal does not receive a GPM during its assigned paging slot cycle, it will wait for additional paging slot cycles, until it receives a GPM. In current hybrid systems, a drop-call timer may expire while the access terminal waits, which causes the IS-856 communication to be dropped. Under IS-856, when the serving base station does not receive any DRC messages from the access terminal for three consecutive time slots (i.e., 240 ms), the base station starts a drop-call timer, which is typically eight to ten seconds in duration. When the drop-call timer expires, the base station ends the communication (i.e., the call is dropped).

For example, when the access terminal tunes away to listen for an IS-2000 page message, the access terminal is no longer communicating on the IS-856 interface, and thus will cease sending DRC messages to the access network on the IS-856 interface. When the serving IS-856 base station does not receive any DRC message for three consecutive frames (i.e., 240 ms), the base station starts a drop-call timer, which in practice, is typically eight to ten seconds in duration. If the access terminal receives a page message as expected, then the access terminal may tune back to the IS-856 and continue its call. If the access does not receive a page message, and remains tuned away until a page message is received, the drop-call timer may expire, causing the call to be dropped. For example, if the drop-call timer is eight seconds, and the access terminal has to wait 10.24 seconds for two page slot cycles (5.12 seconds each) or longer before it successfully receives a page message, the drop-call timer will expire and the IS-856 call may be dropped. Other examples are also possible, and it should be understood that an exemplary embodiment may be implemented in conjunction with a drop-call timer of any duration.

Figure 3:
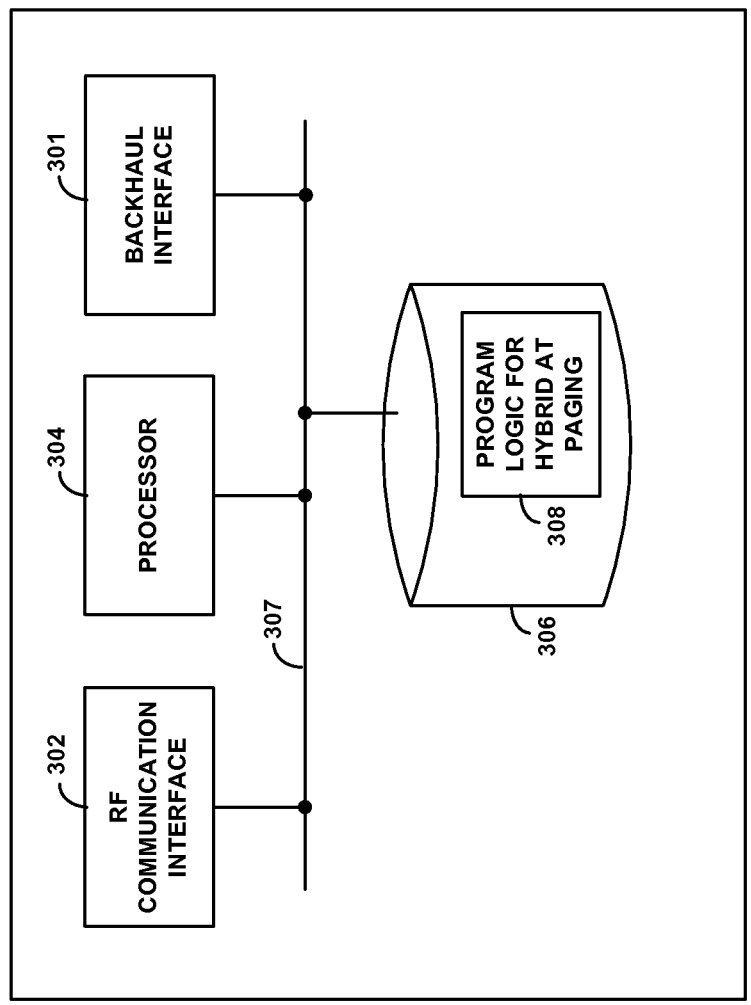
FIG. 3 is a simplified block diagram showing functional components of a base station, according to an exemplary embodiment.

FIG. 3 is a simplified block diagram showing functional components of an exemplary base station 300 (or any other entity or entities arranged to carry out analogous functions). As shown, the base station 300 includes a backhaul interface 301, an RF communication interface 302, a processor 304, and data storage 306, all of which may be communicatively linked together by a system bus, network, or one or more other connection mechanisms 307. Backhaul interface 301 may comprise any sort of communication link or mechanism enabling the base station to exchange signaling and bearer data with other RAN entities, such as an MSC or possibly a BSC (in the event that base station 300 takes the form of a BTS). RF communication interface 302 may comprise any sort of interface enabling base station 300 to engage in air-interface communications with an access terminal.

Processor 304 may comprise one or more processors (e.g., general purpose and/or special purpose processors), such as microprocessors for instance. Further, data storage 306 may comprise one or more volatile and/or non-volatile storage components, such as magnetic, optical, or organic storage components, integrated in whole or in part with processor 304. As further shown, data storage 306 preferably contains program logic 308 (e.g., machine language instructions) executable by processor 304 to carry out various base-station functions described herein, and in particular, to carry out the various hybrid access terminal (AT) paging processes described herein.

According to an exemplary embodiment, a RAN entity or entities, such as base station 300, may be configured to dynamically adjust the page settings used to generate and/or transmit a page to a hybrid access terminal, in order to help increase the probability the hybrid access terminal successfully receives the page. As such, the program logic 306 may be executable to: (a) determine whether or not an access terminal that is about to be paged is a hybrid access terminal, (b) if the access terminal is a hybrid access terminal, then select standard page settings for the page, (c) if the access terminal is a hybrid access terminal, then select adjusted page settings that increase the probability that the access terminal will successfully receive the page; and (d) apply the selected page settings and transmit the page. In an exemplary embodiment, the base station may use adjusted page settings for a hybrid access terminal that include disabling page concatenation and/or increasing page-transmission power, both of which may help to increase the PSR.

Figure 4:
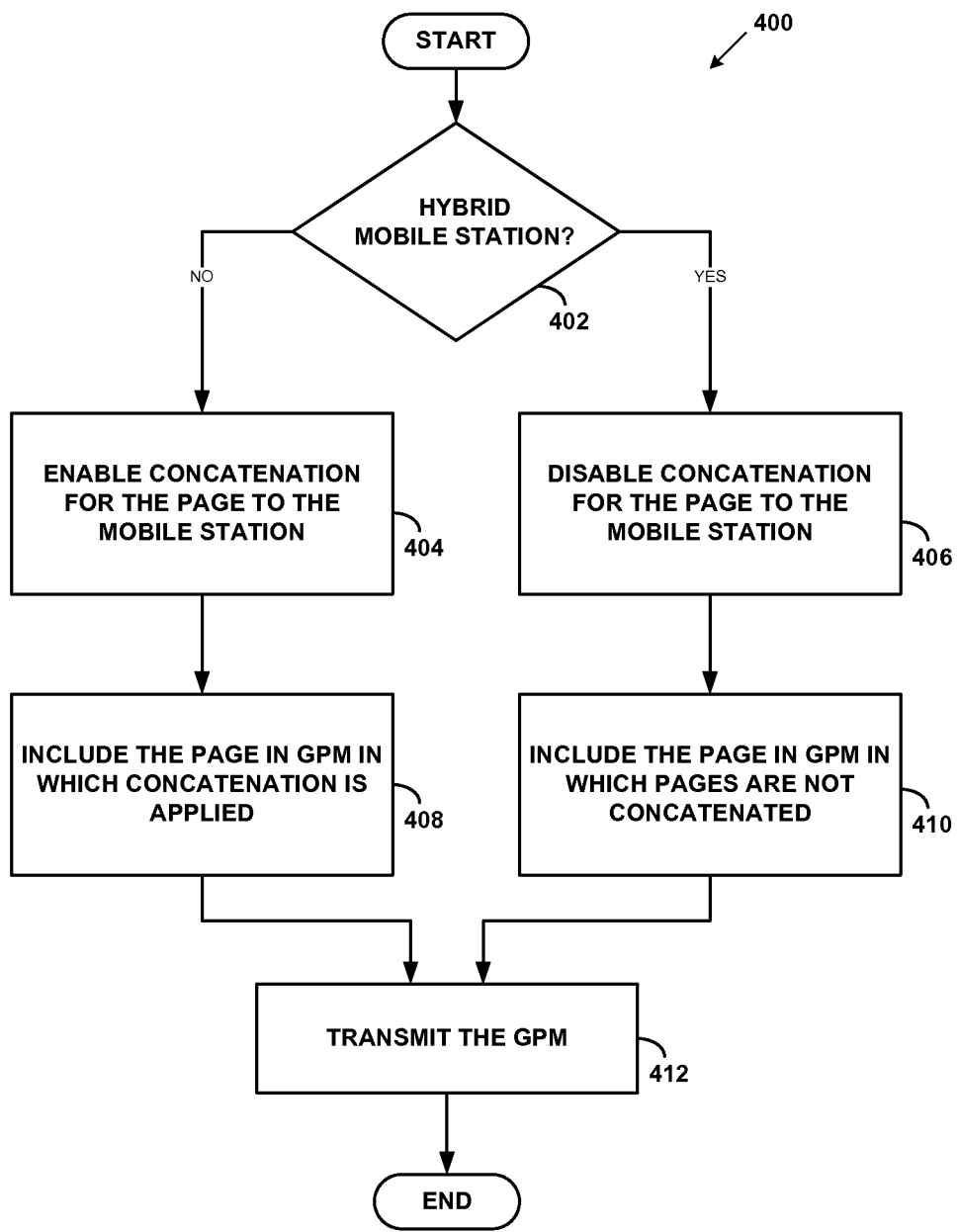
FIG. 4 is another flow chart illustrating a method for paging an access terminal, according to an exemplary embodiment.

FIG. 4 is a flow chart illustrating another method 400, according to an exemplary embodiment. Method 400 illustrates an embodiment in which the RAN attempts to improve the PSR for a hybrid access terminal by disabling page-concatenation for hybrid access terminals. In particular, method 400 involves the access network, before transmission of a page to an access terminal, determining whether or not the access terminal is a hybrid access terminal, as shown by block 402. Then, if the access terminal is not a hybrid access terminal, the access network enables concatenation for the page, as shown by block 404. On the other hand, if the access terminal is a hybrid access terminal, then the access network disables page-concatenation for the page, as shown by block 406.

The access network then applies the selected page settings. More specifically, if the access terminal is not a hybrid access terminal, and concatenation is thus enabled, then the access network preferably includes the page in a GPM in which concatenation is applied as shown by block 408. And, if the access terminal is not a hybrid access terminal, and concatenation is thus enabled, then the access network includes the page in a GPM in which pages are not concatenated, as shown by block 410. In either case, the access network then transmits the GPM to the access terminal via the paging channel, as shown by block 412.

To determine whether or not a given access terminal is a hybrid access terminal, the access network may perform a look-up, based on the access terminal's identifier, such as the Electronic Serial Number (ESN) of the access terminal, which is typically a 32-bit number that is assigned by the manufacturer of the access terminal and uniquely identifies the access terminal. Accordingly, each switch in the access network (e.g., each MSC) may include a database that maps the access-terminal identifier (e.g., the ESN) to the model number and capabilities of the model, including whether or not it is capable of hybrid IS-2000/IS-856 operation. In practice, this database is typically populated and/or updated by the service provider, although it may be maintained and/or created in any manner, and may be stored in an entity other than a switch, without departing from the scope of the invention.

In a further aspect, the access network may adjust the page-transmission power used for hybrid access terminals, in addition to disabling concatenation. As such, a base station may concatenate a page record for a hybrid access terminal, and then transmit a GPM including the page record with a greater page-transmission power than that used for pages to non-hybrid access terminals (i.e., single-mode access terminals). Accordingly, method 400 may further involve, if the access terminal is a hybrid access terminal, then selecting a first page-transmission power for the page, or, if the access terminal is not a hybrid access terminal, then selecting a second page-transmission power for the page (which is preferably greater than the first transmission power). For instance, the base station may increase the page-transmission power by three decibels, effectively doubling the power. However, the amount of the increase may be selected as a matter of engineering design choice.

Figure 5:
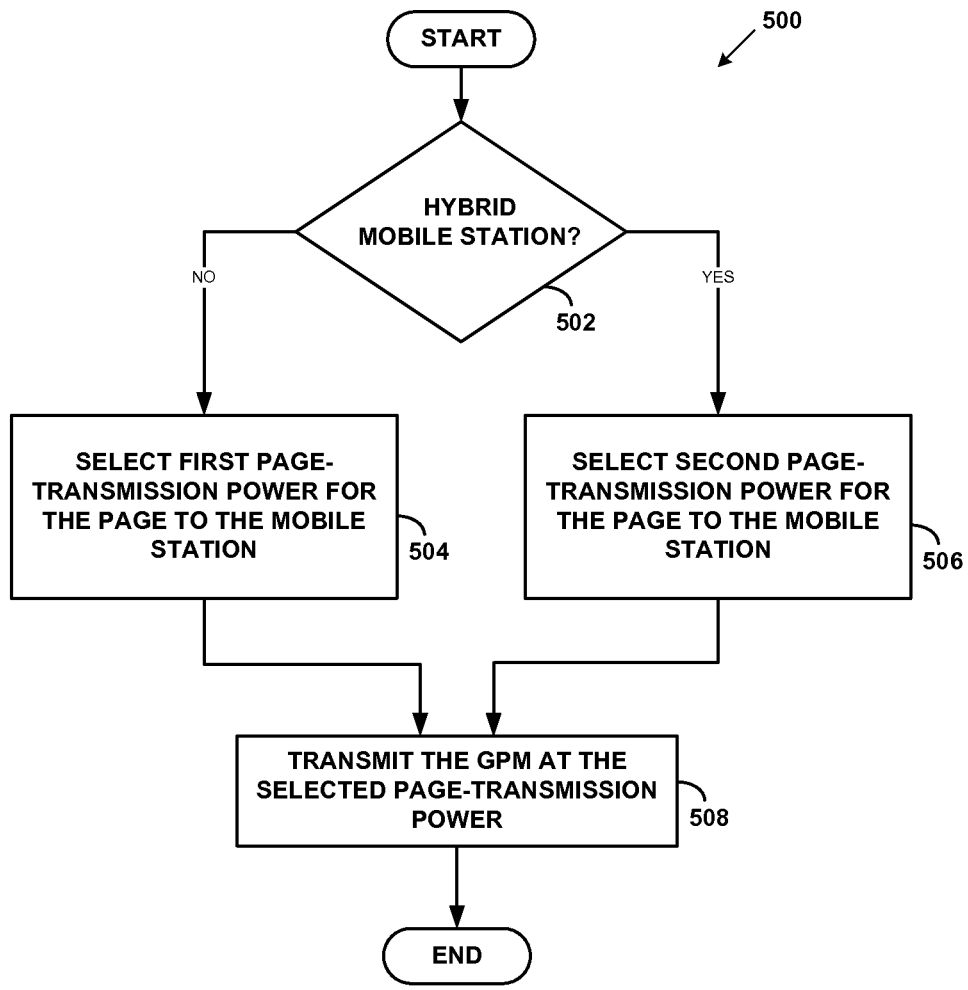
FIG. 5 is another flow chart illustrating a method for paging an access terminal, according to an exemplary embodiment.

FIG. 5 is another flow chart illustrating a method 500, according to an exemplary embodiment. Method 500 illustrates an embodiment in which the RAN attempts to improve the PSR for a hybrid access terminal by increasing the page-transmission power for hybrid access terminals (without disabling concatenation, as discussed in FIG. 4). Method 500 again involves the access network, before transmission of a page to an access terminal, determining whether or not the access terminal is a hybrid access terminal, as shown by block 502. Then, if the access terminal is not a hybrid access terminal, the access terminal selects a first page-transmission power for the page, as shown by block 504. On the other hand, if the access terminal is a hybrid access terminal, then the access terminal selects a second page-transmission power for the page, as shown by block 506. The access network then transmits the page to the access terminal at the selected page-transmission power, as shown by block 508.

As noted, the second page-transmission power is preferably greater than the first page-transmission power, which may help to increase the PSR for hybrid access terminals. For example, in many existing hybrid systems the page-transmission power is set at 1.2 watts. In order to effectively double the page-transmission power, the power may be increased by 3 decibels to 2.4 watts. In other existing hybrid systems, the page-transmission power is set at 0.91 watts, and in these systems, power may be increased by 3 decibels to 1.82 watts. These examples are not to be considered limiting, however. In general, the first-page-transmission power (selected for non-hybrid access terminals) and/or the second page-transmission power (selected for hybrid access terminals) may be defined as a matter of engineering design choice.

In a further aspect, since pages may be grouped in a GPM that has a given transmission power and/or in which the same concatenation technique is applied for all pages, an exemplary base station and/or MSC may group pages for hybrid access terminals such that a given GPM includes only page records for hybrid access terminals (or conversely, includes only page records for non-hybrid access terminals). As such, exemplary methods may further involve an access network, when it is determined that an access terminal is a hybrid access terminal, grouping the page for the access terminal with other pages for other hybrid access terminals for transmission in a GPM (preferably without concatenating these pages). Such a GPM, containing only pages for hybrid access terminals, may then be transmitted with a different page-transmission power than that used for GPMs including pages for non-hybrid access terminals (and preferably with an increased page transmission power).

In yet a further aspect, to help reduce the impact of tuneaway scans, some newer-generation hybrid access terminals have two antennas—a high-gain (primary) antenna and a low-gain (secondary antenna)—that may be simultaneously tuned to the same or different RF frequencies, thus facilitating so-called "Simultaneous Hybrid Dual Receive" ("SHDR") mode or operation. It is anticipated that exemplary embodiments may also be implemented in conjunction with SHDR operation. Specifically, an SHDR-capable access terminal will tune both antennas to the IS-856 air interface to engage in an IS-856 communication session, and use just the low-gain antenna for periodic tuneaway scans on the IS-2000 interface. The IS-856 communication session remains continuous, even during tuneaway scans, albeit at a somewhat reduced sensitivity. However, if the signal received by the access terminal on the IS-2000 interface is too weak to be reliably detected by the low-gain antenna (e.g., owing to the AT's location in the serving sector), then the access terminal will revert to "legacy hybrid mode," in which both antennas tune away to the IS-2000 air interface during the periodic tuneaway scans. In this mode of operation, the IS-856 communication is again interrupted during IS-2000 scans. For at least this reason, it may be beneficial to use an exemplary method in an SHDR-capable system, in an effort to increase the PSR for hybrid access terminals.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method for paging an access terminal, the method comprising:
   before transmission of a page to an access terminal by an access network, the access network determining whether or not the access terminal is a hybrid access terminal;
   if the access terminal is not a hybrid access terminal, then selecting standard page settings for the page, wherein the standard page settings comprise at least one of (a) a standard concatenation setting corresponding to at least some level of concatenation and (b) a standard page-transmission power setting;
   if the access terminal is a hybrid access terminal, then selecting adjusted page settings for the page, wherein the adjusted page settings increase a probability that the access terminal will successfully receive the page; and
   applying the selected page settings and transmitting the page.

2. The method of claim 1, wherein the adjusted page settings for the page comprise at least one of (a) a concatenation setting that reduces or disables concatenation for the page and (b) an increased page-transmission power.

3. The method of claim 1, wherein, if the adjusted page settings are selected, then applying the adjusted page settings comprises at least one of (a) disabling page concatenation and (b) increasing page-transmission power for the page.

4. The method of claim 1, wherein, if the standard page settings are selected, then applying the standard page settings comprises:
   concatenating the page before transmission; and
   using a default page-transmission power for the page.

5. A method for paging an access terminal, the method comprising:
   an access network, before transmission of a page to an access terminal by the access network:
   (a) determining whether or not the access terminal is a hybrid access terminal;
   (b) if the access terminal is a hybrid access terminal, then disabling page-concatenation for the page; and
   (c) otherwise, if the access terminal is not a hybrid access terminal, then enabling page-concatenation for the page; and
   the access network transmitting the page to the access terminal.

6. The method of claim 5, wherein determining whether or not the access terminal is a hybrid access terminal comprises using an Electronic Serial Number (ESN) of the access terminal to look up the type of access terminal and determining if that type of access terminal is capable of dual-mode operation.

7. The method of claim 5, wherein the page comprises a page record, and wherein transmitting the page comprises transmitting the page record in a General Page Message (GPM).

8. The method of claim 5, further comprising, if the access terminal is a hybrid access terminal, then, in addition to disabling page-concatenation for the page, selecting a first page-transmission power for the page.

9. The method of claim 8, further comprising, if the access terminal is not a hybrid access terminal, then, in addition to enabling page-concatenation for the page, selecting a second page-transmission power for the page.

10. The method of claim 9, wherein the first page-transmission power is greater than the second page-transmission power.

11. A method for paging an access terminal, the method comprising:
    an access network, before transmission of a page to an access terminal by the access network:
    (a) determining whether or not the access terminal is a hybrid access terminal;
    (b) if the access terminal is not a hybrid access terminal, then selecting a first page-transmission power for the page; and
    (b) otherwise, if the access terminal is a hybrid access terminal, then selecting a second page-transmission power for the page, wherein the second page-transmission power is greater than the first page-transmission power; and
    the access network transmitting the page to the access terminal at the selected page-transmission power.

12. A system configured to page an access terminal, the system comprising:
    a non-transitory computer readable medium; and
    program instructions stored on the non-transitory computer readable medium and executable by at least one processor to:
    (a) before transmission of a page to an access terminal by an access network, determine whether or not the access terminal is a hybrid access terminal;
    (b) if the access terminal is not a hybrid access terminal, then select standard page settings for the page, wherein the standard page settings comprise a concatenation setting that enables concatenation of pages, and wherein the adjusted page settings comprise a concatenation setting that disables concatenation of pages;
    (c) if the access terminal is a hybrid access terminal, then select adjusted page settings for the page, wherein the adjusted page settings increase a probability that the access terminal will successfully receive the page; and
    (d) apply the selected page settings and cause the access network to transmit the page.

13. The system of claim 12, wherein the standard page settings comprise a first page-transmission power, and wherein the adjusted page settings comprise a second page-transmission power.

14. The system of claim 13, wherein the second page-transmission power is greater than the first page-transmission power.

15. The system of claim 12:
    wherein the standard page settings comprise: (a) a concatenation setting that enables concatenation of pages and (b) a first page-transmission power; and
    wherein the adjusted page settings comprise: (a) a concatenation setting that disables concatenation of pages and (b) a second page-transmission power that is greater than the first page-transmission power.

* * * * *